March 29, 1960     E. H. LAND     2,930,299
MAGAZINE STRUCTURE FOR SELF-PROCESSING FILM
Original Filed Nov. 5, 1946     2 Sheets-Sheet 1
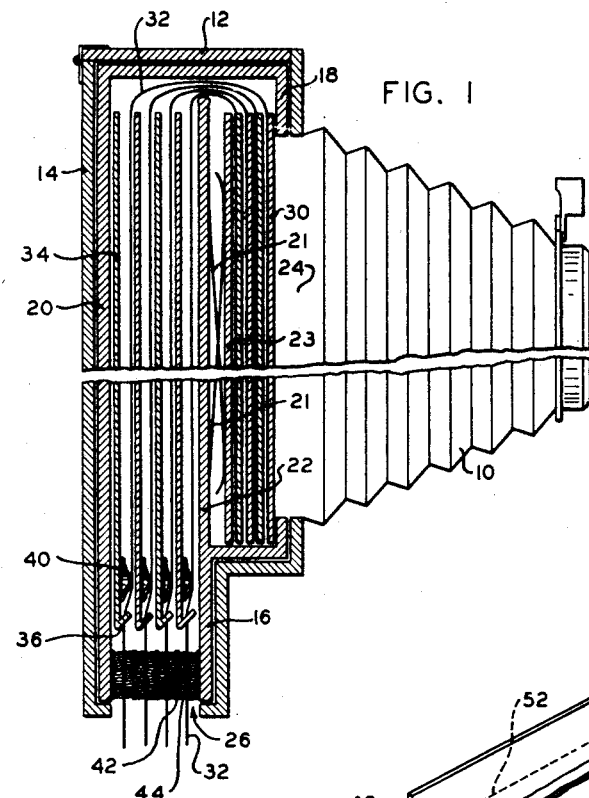
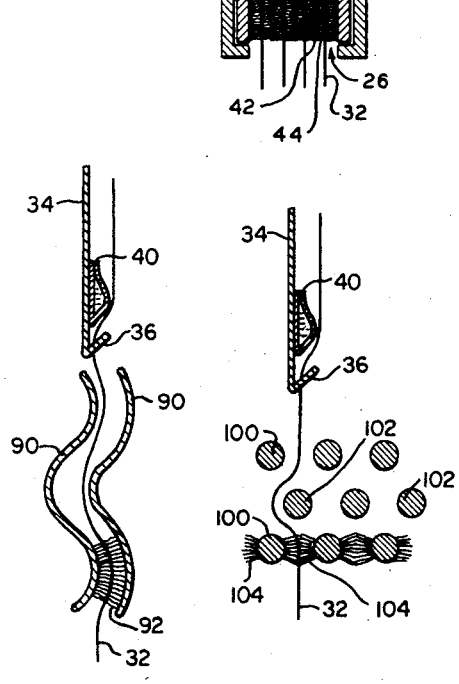
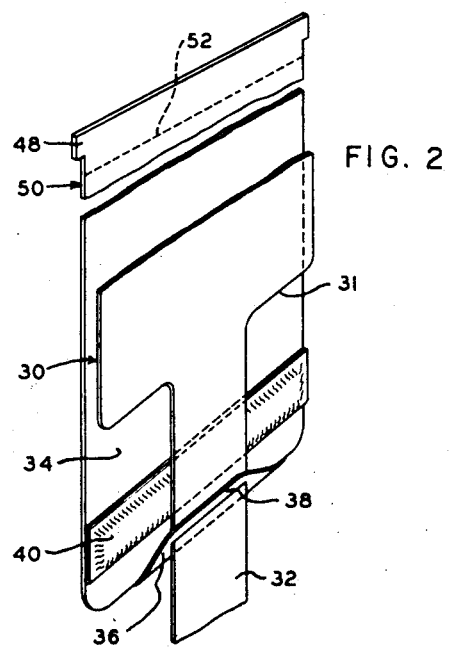
INVENTOR
Edwin H. Land
BY Brown and Mikulka
Attorneys March 29, 1960   E. H. LAND   2,930,299
MAGAZINE STRUCTURE FOR SELF-PROCESSING FILM
Original Filed Nov. 5, 1946   2 Sheets-Sheet 2

INVENTOR
Edwin H. Land
BY
Brown and Mikulka
Attorneys

United States Patent Office 2,930,299
Patented Mar. 29, 1960

2,930,299

MAGAZINE STRUCTURE FOR SELF-PROCESSING FILM

Edwin H. Land, Cambridge, Mass., assignor to Polaroid Corporation, Cambridge, Mass., a corporation of Delaware Application December 21, 1949, Serial No. 134,154, now Patent No. 2,669,168, dated February 16, 1954, which is a division of application Serial No. 707,966, November 5, 1946, now Patent No. 2,495,111, dated January 17, 1950. Divided and this application June 18, 1953, Serial No. 362,590

7 Claims. (Cl. 95—13)

This invention relates to photography and more particularly to novel magazine structures for photographic film assemblages, said magazine structures housing said assemblages and being capable of subjecting the same to a predetermined processing.

This application is a division of my copending application Serial No. 134,154, filed December 21, 1949 for Magazine Structure for Self-Processing Film (now Patent No. 2,669,168, issued February 16, 1954), which in turn is a division of application Serial No. 707,966, filed November 5, 1946, now Patent No. 2,495,111, issued January 17, 1950.

It is one object of the present invention to provide a novel magazine for a photographic film assemblage of the type comprising a photosensitive layer, another layer and a container having therein a liquid composition, said magazine mounting the photosensitive layer of said assemblage in one portion thereof and the other layers of said assemblage in a different portion thereof, the magazine being so constructed that by a simple pulling operation one of the layers can be moved into a predetermined operative processing relationship with the container and the other layer and the assemblage processed to produce therein a postive image.

Another object of the invention is to provide a photographic product comprising a novel housing or magazine for at least one film assemblage of the type releasably containing a liquid, said housing having a processing means for each film assemblage, said means being capable of performing one or more of the functions of releasing said liquid within said assemblage, spreading said liquid between two layers of the film assemblage, wiping the excess liquid from the sides and end of the assemblage and forming a light seal for the housing.

Another object of the present invention is to provide a novel photographic product of the above type providing a novel magazine which is cheap, simple to assemble, disposable and embodies within itself all the means necessary to process a film assemblage, acting as a trap for any excess processing liquid and being usable in standard film pack cameras so that a positive image can be directly obtained with existing cameras.

These and other objects of the invention will in part be obvious and will in part appear hereinafter.

For a fuller understanding of the nature and objects of the invention reference should be had to the following detailed description taken in connection with the accompanying drawings wherein:

Figure 1 is an exaggerated schematic partially crosssectional view of a preferred modification of the invention showing its relationship to a camera;

Fig. 2 is an exaggerated diagrammatic fragmentray perspective view of a portion of the novel photographic film assemblage of the above type showing the relationship of the elements thereof during the use of the invention;

Fig. 5 is a diagrammatic fragmentary cross-sectional view of a modified withdrawal opening contemplated by the present invention; and Fig. 6 is a diagrammatic cross-sectional view of another type of withdrawal opening.

Figure 3:
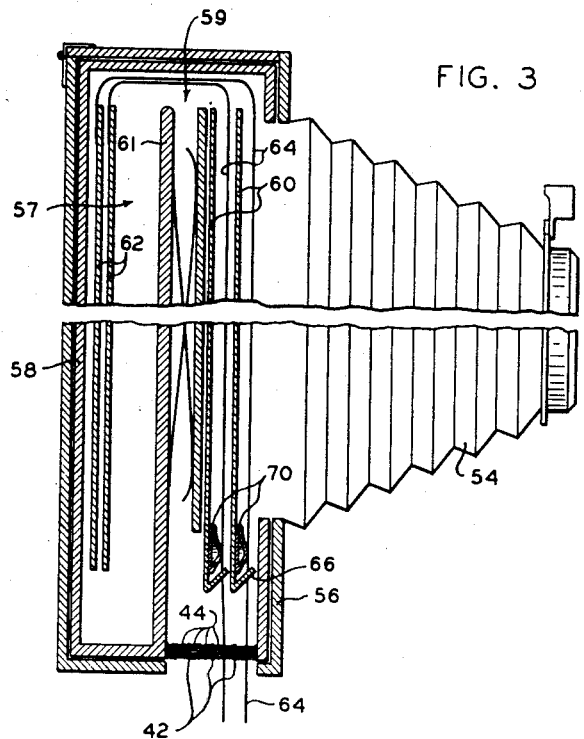
Fig. 3 is an exaggerated diagrammatic sectional view of another modification of the invention.

In general, this application relates to a photographic product comprising a novel magazine structure for one or more photographic film assemblages of the type which includes a photosensitive layer, another layer and means releasably confining a liquid composition, the magazine preferably comprising means for processing said assemblage by causing the release of said liquid and the permeation of said liquid at least into said photosensitive layer.

The several layers of each assemblage are preferably slidably positioned within said magazine and have, in their stored position in said magazine, a relationship permitting exposure of said photosensitive layer, and said layers, in another position in said magazine, have a relationship permitting processing of said assemblage with said container in position to discharge said liquid composition between said layers.

The magazine preferably comprises means defining a plurality of withdrawal openings from said magazine, there being one withdrawal opening for each film assemblage, a portion of each of said film assemblages extends through its associated withdrawal opening, and means are associated with each of said withdrawal openings for releasing said liquid from said container as said film assemblage is withdrawn from said magazine.

Referring now to the preferred modification of the invention shown in Fig. 1, there is provided a housing, or magazine, generally indicated at 16, and a plurality of photographic assemblages, each of said assemblages comprising a photosensitive layer 30, another layer 34, and a container 40. These layers are normally stored in the magazine so that the layers of the assemblage have an exposure relationship, i.e., one permitting exposure of the photosensitive layer 30. When the layers are in this exposure relationship the photosensitive layer 30 is preferably positioned so as to be facing an exposure opening in the magazine. The other layer 34 is preferably positioned in another portion of the magazine so that it will not interfere with the exposure of the photosensitive layer to actinic light.

When the layers of the assemblage are in their proper relationship for processing of the assemblage, the two layers of the assemblage are preferably in face-to-face parallel relationship and the container is positioned so as to discharge its liquid between the adjacent faces of these layers. In order that the layers of the assemblage may be positioned in this processing relationship, one of the layers is preferably provided with a leader 32, or extension thereof. This leader 32 preferably extends to the outside of the housing or magazine 16, where it may be grasped by the user of a camera to cause a movement of its associated layer from the position occupied by this layer when the layers are in their exposure relationship to the position occupied by this layer when the layers are in their processing relationship. During this movement of one layer, the other layer is preferably held stationary as by friction. This leader 32 is preferably connected to the photosensitive layer 30 and so related to the other layer 34 that after a predetermined movement of the leader, the other layer is engaged and moved along with the photosensitive layer.

The container 40 for the liquid is preferably one which can, by the application of a mechanical stress thereto, be caused to release its contained liquid. A preferred type of container is one formed so that a mechanical stress applied thereto will cause one edge of the container to be opened to release the liquid from this edge. The container preferably extends transversely of the assemblage and has a relatively short longitudinal dimension with respect to the longitudinal dimension of the assemblage. A preferred container is formed of a single sheet of material which is impervious to the liquid. The sheet is folded upon itself and sealed on the ends and along the edge opposite the fold, the end seals being preferably stronger than the edge seal. The container is preferably stored in the magazine and is operatively associated with one of the layers, this layer preferably being a layer other than the photosensitive layer, and the container being preferably adhesively secured thereto.

The processing of the film assemblage may be accomplished by releasing the liquid from the container 40, by the application of a mechanical stress thereto, as the film assemblage is held stationary, or preferably by moving the assemblage past a portion of the magazine adapted to apply a mechanical force to said assemblage as said assemblage moves with respect to this portion. The released liquid is also preferably spread by this portion of the magazine, during the processing movement, in a uniform thin layer between the photosensitive layer 30 and the other layer 34 so as to effect the uniform permeation of at least the photosensitive layer 30 by the liquid.

The processing portion of the magazine 16 preferably comprises means 42, defining a withdrawal or discharge opening therefrom. In the preferred modification of the invention there are provided a plurality of such assemblages and the magazine is preferably provided with a plurality of means defining a plurality of withdrawal openings, through which the assemblages are adapted to be withdrawn, there being one opening for each assemblage. The means 42 defining a withdrawal opening preferably apply a mechanical stress to the assemblage, as it is withdrawn therethrough by its associated leader, this stress acting to release the liquid from the container and to spread the liquid throughout a predetermined portion of the film assemblage to cause the processing thereof.

It is desirable that the means defining the withdrawal opening from the magazine have a fourfold function. It should act as a light seal. It should be capable of releasing the liquid from the container. It should be able to spread the liquid uniformly. It should act to wipe the excess liquid from the film unit and trap this excess within the magazine. For the purposes of compactness of magazine construction, the above functions are preferably combined in a single coacting pair of members defining the withdrawal opening. However it is possible to provide a plurality of elements for accomplishing these functions without departing from the scope of the invention. As an example, there may be a means for releasing the liquid, a means for spreading the liquid and a means for forming a light seal, all of these means being separate cooperating elements associated with the means defining the opening.

In Fig. 1, there is also shown a schematic representation of a camera 10, having a magazine holder indicated at 12. In the rear of the camera there is provided a cover 14, which may be removed to permit introduction of one of the novel magazines 16 into the magazine holder. This magazine comprises a front portion 18 and a rear portion 20. Dividing these two portions is a wall 22. In the front wall of the magazine there is provided an exposure opening 24, which permits exposure of the photosensitive layer 30, positioned at the front of the magazine. At the bottom rear portion of the magazine there is provided an opening 26.

A portion of one of the photographic assemblages is also shown in Fig. 2 where like numbers correspond to like elements of Fig. 1. In Fig. 2 the photosensitive layer has been moved to such an extent that the layers are almost in their processing relationship. Consideration of Fig. 2 along with Fig. 1 is helpful in an understanding of the invention. As can be seen from Fig. 1, these photosensitive layers 30 are stacked in parallel relationship in the front portion of the magazine, the foremost of these layers being in registry with the exposure opening 24 so that it may be exposed by operating the usual camera shutter. Behind the stack of the photosensitive layers there is preferably provided a backing plate 23 and a spring 21 to hold the foremost photosensitive layer flat in the focal plane of the camera.

From the top edge of the photosensitive layer 30 there extends the leader 32, which may be an integral portion of the photosensitive layer, as shown in Fig. 2, or which may be a strip of paper or cloth secured to either the front or back top edge of the photosensitive layer. This leader 32 extends into the rear portion of the magazine through the whole length thereof and out through the opening 26 in the bottom of the magazine. The leader 32 is preferably made narrower than the photosensitive layer so as to provide a shoulder 31 (shown in Fig. 2) at the junction between the leader and the photosensitive layer.

Positioned in the rear portion of the magazine are a plurality of the other layers 34. In the preferred form of the film assemblage this other layer 34 is adapted to receive and carry a positive image of the latent negative image in the photosensitive layer and is referred to hereinafter as an image-carrying layer. It is desirable to limit the amount of movement of the photosensitive layer with respect to the other (image-carrying) layer 34 so that when the photosensitive layer is moved from its exposure relationship to its processing relationship, no further relative movement of these layers is permitted. For this purpose, there is provided a means associated with the image-carrying layer 34 adapted to engage a means associated with the leader 32 or the photosensitive layer 30. In a preferred way of forming the means on the image-carrying layer, the bottom edge thereof is bent back upon itself and there is provided a slit 38 (shown more clearly in Fig. 2) sufficiently wide to permit the leader 32 to pass therethrough but not sufficiently wide to permit the photosensitive layer 30 to pass therethrough. The engaging means associated with the leader or photosensitive layer preferably comprises the shoulder 31 at the junction between the photosensitive layer 30 and leader 32.

In the bottom rear portion of the magazine there are provided the plurality of means defining withdrawal openings, which may be made in a number of ways and from a wide variety of materials. They can be formed of metal strips which can be placed under tension. They can be made of a metal stamping having springy tongues adapted to engage opposite outer surfaces of the composite film assemblage. In the preferred modification shown, they comprise a strip of metal 42 having a layer of a compressible light-seal material, such as felt 44, on each side thereof. Numerous materials other than felt, such as velvet or bristles, can be utilized as a light seal. In some cases the felt or velvet may serve only a light-seal function, while in other cases it may serve the function of breaking the container, spreading the liquid, and trapping the excess liquid. As can be seen from Fig. 1, each leader 32 extends between a pair of these felt-covered metal strips, these strips defining an opening which is preferably slightly smaller than the combined thickness of an image-carrying layer, a container, and a photosensitive layer. These openings serve the function of permitting the withdrawal of the film units from the magazine, the felt 44 acts to prevent the access of light to the interior of the magazine, and the means 42—44 act to release the liquid composition from the containers, spread this liquid between the photosensitive layer and the image-carrying layer, and trap any excess liquid within the magazine.

In a preferred modification of the invention the photosensitive layer 30 is formed of a photosensitive silver halide such as an emulsion of a silver halide, or a mixed silver halide, or a silver mixed halide. This emulsion is preferably coated on an opaque paper base, which is relatively cheap, and may have an integral extension constituting the leader 32. In this way it is relatively simple to manufacture a one-piece combination photosensitive layer and leader. It is possible, however, to coat the photosensitive emulsion upon a suitable base material such as cloth, paper, or cellulosic plastic, or other materials suitable for carrying photosensitive emulsion. In these latter instances the base which carries the photosensitive emulsion may or may not be integral with the leader 32. This leader may be made of paper, cloth, or cellulosic plastic, or other materials having sufficient tensile strength to permit the use of the leader for withdrawing the photosensitive layer from the forward part of the magazine to the rear part of the magazine, and for withdrawing the film assemblage through the withdrawal opening. In some cases it is desirable to coat the back surface of the base for the photosensitive layer 30 with wax or other material capable of imparting to this surface an anti-friction surface, thus permitting easier withdrawal of the photosensitive layer from the forward portion of the magazine.

The image-carrying layer 34 perferably comprises a sheet of opaque white paper known in the art as baryta paper, which preferably has either an opaque black paper backing or is treated on the back side thereof with a black coating to increase its opacity to actinic light. While baryta paper is a preferred material for the image-carrying layer, many other materials can be used. It can be made of paper, gelatin, regenerated cellulose, polyhydroxy alkanes such as polyvinyl alcohol, sodium alginate, certain of the cellulose ethers, such as methyl cellulose and their derivatives such as sodium carboxymethyl cellulose or hydroxyethyl cellulose, carbohydrates such as gums or starch, and mixtures of these materials where the latter are compatible. Where this image-carrying layer is formed of transparent plastics of the general type mentioned above, the plastics may be coated on a paper base or may be so treated that the surface to be positioned adjacent the photosensitive layer appears white by reflected light. They are also preferably provided with a backing which is opaque to actinic light. The portion 36 is preferably formed integrally with the image-carrying layer 34 and is bent upwardly during the process of manufacture. The slit 38 in the bent portion 36 is preferably formed so as to be just wide enough to permit the passage of the leader 32 therethrough. In some cases, particularly where the image-carrying layer 34 and upwardly bent tab 36 are formed of relatively thin paper, it has been found desirable to reinforce this portion of the image-carrying layer and also to reinforce the edges of the slit 38 by the use of cloth, paper, or metal inserts which prevent tearing thereof. In this connection it is also sometimes desirable to reinforce the junction between the shoulder 31 on the photosensitive layer 30 and the leader 32. The liquid-container 40 is preferably formed of a paper-backed metal foil, coated on the inner surface thereof with a resin such as polyvinyl butyral which is inert to alkalies.

The liquid composition in the container 40 preferably comprises a developer such as hydroquinone, a preservative such as sodium sulfite, a film-forming substance such as sodium carboxymethyl cellulose, a silver halide solvent such as sodium thiosulfate, an alkali such as sodium hydroxide, and a sufficient quantity of water to carry the above-mentioned elements in solution. The magazine may be formed of metal, cardboard, or molded plastic. It is preferably of sufficient rigidity so that it may be handled as a unit, and should be opaque to actinic light. In the preferred method of assembly of the above-mentioned film elements and magazine, the desired number of photosensitive layers 30, with their associated leaders 32, are placed in the forward portion of the magazine, the leaders extending to the rear portion. The foremost leader is then threaded through the slit 38 in the foremost image-carrying layer and is placed adjacent one of the felt-covered strips 42—44, the leader extending through the opening 26. Another strip 42—44 is placed adjacent the first leader, the next leader is threaded through a slit 38 in its associated image-carrying layer, and is then placed next to the last-mentioned strip 42—44. Another strip 42—44 is then placed next to this leader and the film pack is thus built up until the desired number of image-carrying layers have been placed therein. The rear wall 20 of the magazine is then placed in position and the magazine is ready for use. A spring element (not shown) may be placed between the last strip 42—44 and the wall of the magazine.

In the use of the preferred modification of the invention, which has been described in connection with the discussion of Figs. 1 and 2 above, the foremost photosensitive layer 30 in the magazine is exposed to actinic light by suitably operating the shutter mechanism of the camera 10. The user of the camera then engages that portion of the leader 32, associated with this foremost photosensitive layer, which extends through the bottom of the magazine. By pulling this leader, the photosensitive layer 30 is pulled upwardly and over the wall 22 separating the two portions of the magazine, and moved to the rear of the rear portion and downwardly in this rear portion. As the photosensitive layer 30 moves downwardly adjacent the image-carrying layer 34, positioned in the rear of the magazine, it can be seen that the surface of the photosensitive layer which was closest to the camera lens is now adjacent the inner surface of the image-carrying layer 34. Fig. 2 shows the photosensitive layer 30 in a position where it has been moved from the front of the magazine to the rear portion and is moving downwardly in this rear portion. When the leader 32 is pulled downwardly somewhat more than is shown in Fig. 2, the shoulder 31 on the photosensitive layer engages the edges of the slit 38 and prevents further relative movement of the photosensitive layer 30 with respect to the image-carrying layer 34. Therefore, further movement of the leader 32 moves the whole film assemblage, comprising the image-carrying layer 34, the container 40, and the photosensitive layer 30, into and through the opening defined by the means comprising the pair of strips 42—44. As this film assemblage is pulled through this opening, the pressure on the container 40 increases to such an extent that the liquid contained therein is forced from the container and is discharged between the photosensitive layer 30 and the image-carrying layer 34. Further movement of the assemblage through the opening causes the strips 42—44 to spread this liquid composition in a uniform thin layer between the photosensitive layer and the image-carrying layer. As the assemblage is pulled completely through the opening, any liquid which is still being spread is wiped off the end of the composite assemblage and adheres to the strips 42—44. As a result of this spreading process, the photosensitive layer is laminated to the image-carrying layer by the viscous liquid composition. Since these two layers are preferably opaque to actinic light, at least on the outer surface thereof, no light can penetrate to the inner photosensitive surface. Therefore, this composite lamination may be pulled from the camera directly into daylight and the photographic process may continue unhampered by the presence of actinic light.

When the liquid layer exists between the exposed photosensitive layer and the image-carrying layer, the developer therein develops the exposed photosensitive material, the silver halide solvent forms soluble silver complexes with the undeveloped silver halide and transfers these soluble complexes to the surface of the image-carrying layer where they are converted to insoluble colloidal particles by reaction with unused portions of the developer. After this process of positive image-formation is completed, the photosensitive layer is preferably stripped from the image-carrying layer to reveal the final positive image. This processing may require anywhere from a few seconds to several minutes, depending upon the chemical constituents involved.

There is thus provided a novel magazine with novel film assemblages, adaptable for use with a standard camera, which permits the production, in a preferred form of said assemblage, of a positive image of a subject image toward which said camera is directed. As can be seen, this invention provides substantially dry development which is accomplished by a single simple operation. No baths are needed and no special camera or developing apparatus is required. Any excess of the viscous liquid composition is wiped from the film unit by the means defining the withdrawal opening and is trapped within the disposable magazine.

While the above description of the invention has been limited to the preferred modification thereof, the present invention is capable of considerable variations within the broad scope thereof. In connection with the construction of the magazine, a preferred form has been shown wherein the means which define the withdrawal openings are positioned in the bottom of the rear portion thereof. It is contemplated that these withdrawal openings may be positioned at the top of the magazine, such construction depending upon the particular type of camera with which the magazine is to be used. In either case, the operation of the withdrawal openings is the same.

There are many other modifications possible for the means defining these withdrawal openings, and it is possible to provide a single withdrawal opening through which all of the leaders 32 are threaded. This modification is not as desirable as the one shown in Fig. 1, since a considerable unit area of pressure is required for releasing the liquid composition from the container, and this pressure, in some cases, may be sufficiently high so as to create a considerable friction between the film element passing through the withdrawal opening and adjacent leaders extending through the opening. This friction may be sufficient to cause a movement of these other leaders. Such a modification of the invention is feasible, however, particularly where means are provided for increasing the resistance to withdrawal of the photosensitive layers from the forward portion of the magazine. Such a means can be a pin extending through a weakened portion in the lower edge of the photosensitive layers.

Another modification of the invention contemplates the breaking of the container and the spreading of the liquid solely by closely spaced metal members which may or may not have a certain flexibility.

Since the novel magazine described above is preferably sold as a unit for insertion in a camera, it is preferred to provide a cover sheet which is positioned in front of the foremost photosensitive layer 30 for the purpose of preventing access of actinic light to the photosensitive layers when this magazine is handled in daylight. Such a layer is not shown but may be easily provided by placing an opaque piece of paper in front of the foremost layer 30 within the magazine. Preferably attached to this opaque layer is a leader similar to the leaders 32, so that this cover sheet may be withdrawn from the magazine after the magazine has been inserted in the camera.

While the film assemblage has been described in connection with a preferred embodiment thereof, numerous other photosensitive materials may be utilized. The photosensitive layer may comprise a photosensitive material other than a silver halide and developers other than those mentioned above may be advantageously employed. It is also possible to utilize in the present invention processes wherein it is not desired to obtain a positive image. In such a case the liquid composition in the container 40 may comprise materials for developing or developing and fixing a negative with no emphasis on producing a positive image at the same time.

It is also possible to utilize transfer processes for forming a visible image on the image-carrying layer other than those discussed above. For instance, it is feasible to utilize a liquid composition which includes no silver halide solvent and to include on the image-carrying layer a substance capable of forming a positive image by reaction with unreacted portions of a developer utilized for developing the latent negative image in the photosensitive layer. This substance may be an oxidizing agent which is capable of oxidizing portions of the developer which are unoxidized by reaction with the photosensitive material in the negative photosensitive layer. If the developer is a color-forming developer, a positive image in terms of oxidized developer is obtained upon the image-carrying layer. It is equally possible to use a reducible metal salt on the image-carrying layer, this salt being selectively reduced to form a positive image by unreacted portions of the developer. In both of the above methods it is desirable to provide some means for positively assuring selective reaction of the developer before the developer is made available for the positive image-forming reaction. A satisfactory means of accomplishing this purpose is the provision of a slowly permeable layer coated on the surface of the image-carrying layer.

The invention has been described in connection with the use of a liquid composition which includes all of the elements necessary to process the film unit. This liquid composition may, however, include only water or an aqueous solution of a film-forming material, and the other substances, such as hydroquinone, hypo, etc., may be coated in solid form on the image-carrying layer where they can be subsequently dissolved as the liquid composition is spread in contact with the image-carrying layer. It is also possible to include some of the active ingredients in the liquid composition and to coat other of the active ingredients on the image-carrying layer, all of these modifications being within the scope of the present invention.

In some cases it is desirable to leave a portion of the film unit between the means defining the withdrawal opening from the magazine. This is desirable in those cases wherein the rigidity of the means defining the opening is obtained partially from the casing of the magazine, that is, in those cases where the means defining the opening are in themselves quite flexible and their rigidity is obtained by being stacked in the opening of the magazine. In the modification of Fig. 1, the various leaders extending through the withdrawal openings add a certain bulk to the total thickness of the felt-covered strips defining these openings and resist any bending movement which might occur due to the passage of a film assemblage between an adjacent pair of felt-covered strips. If, during the processing, most of these leaders are removed, the effective pressure which can be applied to the last few film assemblages may be decreased. It is contemplated therefore to leave within the withdrawal opening a member having substantially the same thickness and compressibility as the leader 32 for the purpose of maintaining this structural rigidity. Such a member may be a portion of or attached to either the photosensitive layer or the image-carrying layer. This feature of the invention is shown at the top of Fig. 2 wherein there is shown a member 50 which may be assumed to be the topmost portion of the image-carrying layer 34. As can be seen, this member 50 has transversely extending shoulders 48 which impart to this member 50 a greater transverse dimension than the remainder thereof. When these shoulders are moved to the withdrawal openings, they cannot pass completely therethrough since the exit from the withdrawal opening, in this case, is made narrower than the total transverse dimension of that portion of the member 50 encompassed by the shoulders. Therefore, this portion 48 of the member 50 is held within the withdrawal opening and may be separated from the remainder of the assemblage by tearing along a weakened portion diagrammatically shown at 52. This member 50 may be, as mentioned above, either a portion of the image-carrying layer 34 or a portion of the photosensitive layer 30, or may be a separate member attached to one or the other of these two layers. It preferably has substantially the same thickness and compressibility as the leader 32 so that, as the individual film assemblages are withdrawn, the unused withdrawal openings neither gain nor lose their effective size or structural rigidity. This modification of the invention may also have utility in preventing loss of light seal value of a compressible material such as felt due to its taking a permanent set under prolonged compression.

In another modification of the invention, a somewhat similar magazine is employed, the photosensitive layers being situated in the front portion and the image-carrying layers being in the rear portion thereof. In this case, however, the leaders are connected to the image-carrying layers and are slidably joined to the photosensitive layers. In this modification, the containers are preferably associated with the photosensitive layers. Since, in practicing the invention it is desirable to contact the liquid with the surface of the photosensitive emulsion which is first exposed to light, it is desirable to have the leader adjacent that surface of the photosensitive layer which is nearest the camera lens. This leader, therefore, should either be transparent, to permit exposure therethrough, or be positioned adjacent the edges of the photosensitive layer so as not to interfere with the exposure of the photosensitive layer. In this case, the withdrawal openings in the magazine are associated with the front portion thereof and the leaders of the various film assemblages are threaded through these openings.

Figure 4:
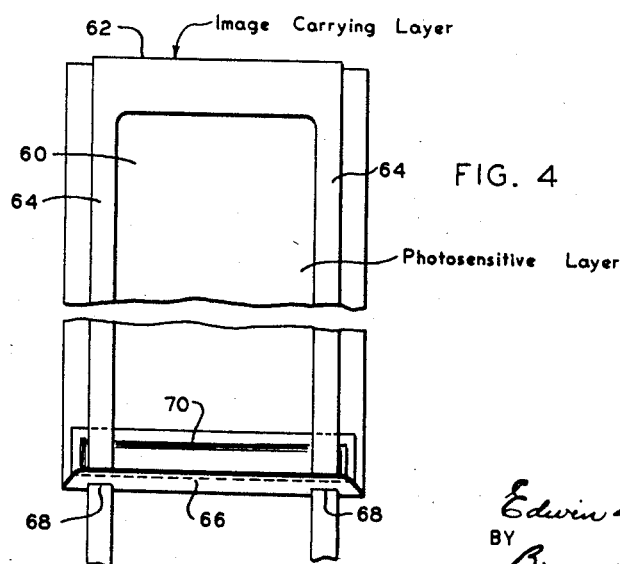
Fig. 4 is a front view of a modification of the invention shown in Fig. 3.

This latter modification of the invention is shown schematically and diagrammatically in Figs. 3 and 4. In these figures, Fig. 3 is an exaggerated cross-sectional view of a magazine embodying a number of film assemblages showing this modification of the invention, while Fig. 4 is a front view of one of the assemblages showing in more detail one modification of the leader which may be utilized for accomplishing the purpose of the invention. In Fig. 3 there is schematically represented a camera 54 having a magazine holder 56 containing a magazine, generally represented by numeral 58. This magazine has a rear portion 57 and a front portion 59 with a wall 61 dividing these portions. Positioned in the front portion of the magazine are a plurality of photosensitive layers 60 having a bottom tab portion 66 in which there is provided a slit 68, shown more clearly in Fig. 4. In the rear portion of the magazine there are provided a plurality of image-carrying layers 62 which have connected to the top edge thereof leaders 64. Each of these leaders 64 may be a sheet of transparent plastic, such as a sheet of cellulose acetate, extending through the slit 68 in the tab 66 of the photosensitive layer, or the leader may comprise a pair of leaders (as shown in Fig. 4) formed of paper, cloth, or other materials, extending through the slit, or pair of slits, 68 in the tab 66. In Fig. 4 the leader 64 is shown as having moved the image-carrying layer 62 partially from the rear portion of the magazine. On the lower foremost surface of each photosensitive layer there is preferably provided a container 70 having therein a liquid composition. This container may be secured to the photosensitive layers, such as by the use of suitable adhesives. The leader 64 extends between means 42—44 defining a withdrawal opening.

In a preferred modification of the invention shown in Figs. 3 and 4, the various elements may be formed of materials stated as being preferable for like elements of the embodiment of the invention shown in Figs. 1 and 2.

In the use of the modification of the invention shown in Figs. 3 and 4, the photosensitive layer 60 is exposed to a subject image by operating the shutter of the camera 54. The leader 64, associated with the foremost photosensitive layer, is then withdrawn by the user of the camera, thus moving the image-carrying layer from the rear portion of the magazine to the front portion, and in face-to-face engagement with the photosensitive layer 60. Further movement of the leader 64 brings the image-carrying layer into engagement with the edges of the slit 68 and causes the photosensitive layer, the container, and image-carrying layer to move downwardly and through the means defining the opening for the purpose of processing the film assemblage.

The processing of this type of film assemblage is similar to that mentioned in connection with the discussion of Figs. 1 and 2. The movement of the film assemblage through the means defining the opening acts to release the liquid composition from the container and to spread it in a uniform thin layer between the image-carrying layer and the photosensitive layer. As previously described, this layer of liquid composition develops the latent negative image and produces a positive image on the surface of the image-carrying layer. After a predetermined time for the above processing to be completed, the photosensitive layer is stripped from the image-carrying layer so as to reveal the positive image.

While the above modifications of the invention have been described in connection with the preferred forms thereof, it is equally possible to provide a plurality of the novel film elements in a type of magazine which is not equipped with means at the withdrawal point thereof for processing the film unit. In such a case the opening or openings may be so designed as only to form a light seal therefrom, and may not have such rigidity, with respect to the releasability of the liquid from the container, so as to release this liquid when the film assemblage is withdrawn from the magazine. In such a case, the camera is preferably provided with means for applying a mechanical stress to the film assemblage.

It is desirable to provide the withdrawal opening in the form of a tortuous passage which is adapted to apply both a bending and a compressive stress upon the container as it is withdrawn through this opening. Such a modification of the invention is shown in Figs. 5 and 6. As will be apparent from a study of these two figures, this modification of the invention may take a number of various forms.

Referring now to Fig. 5, where like numbers correspond to like elements of Fig. 1, there is shown a fragmentary cross-sectional view of a modification of the invention wherein a tortuous withdrawal opening is provided for the film assemblage as it leaves the magazine. In Fig. 5 there is shown a leader 32 adapted to be attached to a photosensitive layer, not shown, this leader running along the face of an image-carrying layer 34 and through a slit formed in the upturned bottom edge 36 of the image-carrying layer. There is also provided the usual container 40 for the liquid composition. The means defining the withdrawal opening for each individual film assemblage comprise, in a preferred modification of this form of the invention, a pair of metal plates 90 bent around axes parallel to the transverse dimension of the container. As can be seen, these members define a tortuous passage which in itself affords considerable light seal to the opening, particularly when these metal members are treated so as to have a black nonreflecting surface thereon. For the additional purpose of providing more of a light seal, a strip 92 of compressible material such as felt may be secured at the outer ends of these members 90. This felt strip 92 also aids in wiping any excess liquid composition from the sides and end of the film assemblage as it is withdrawn therepast.

In the use of the modification of the invention shown in Fig. 5, as the film assemblage moves through the withdrawal opening, a compressive and bending stress is applied to the container, thus releasing the sealed edges of the container so as to permit the liquid to be discharged therefrom and spread in a uniform thin film between the two layers of the film assemblage. Any excess liquid composition being spread in the film assemblage, as the ends thereof pass the felt strip 92, is wiped off the film assemblage by the felt, thus leaving the end and edges of the film assemblage clean when it is discharged from the magazine.

In forming a plurality of withdrawal openings by means of the members 90, it is desired that these members be so spaced that the distance therebetween is about the thickness of the film unit to be drawn therethrough at the container portions of the film assemblage, although where materials of the film assemblage are very flexible, it may be necessary to have a closer spacing for these members. It is also desirable that the adjacent curved surfaces of the two members should cross a plane drawn between the entrance and exit from the withdrawal opening so that a film assemblage drawn therethrough must be considerably deformed in its passage through this opening. This deformation of the film assemblage may, in itself, release the liquid from the container, or the pressure exerted on the container by the curved surface around which the film assemblage is deformed may increase the pressure within the film assemblage to such an extent that the liquid is released from the container. This pressure, of course, will depend to a certain extent upon the surface friction of the materials utilized in the film assemblage and the surface friction of the members 90, this pressure being low when the friction is low and high when the friction is high.

In the modification of the invention of Fig. 6 there is shown another form of the tortuous type of withdrawal opening described in connection with the discussion of Fig. 5 above. In this modification of the invention, however, the withdrawal openings are defined by spaced rods which are so positioned, with respect to the plane of withdrawal movement, as to cause the film assemblage being withdrawn to depart from this plane and to be subjected to a bending stress around a pressure-applying point. Referring specifically to Fig. 6 where like numbers correspond to like elements of Figs. 1 and 5, there is provided the usual leader 32 which may be secured to a photosensitive layer, not shown. There is also provided an image-carrying layer 34 having an upturned portion 36 through which the leader 32 extends. The image-carrying layer also preferably has secured to its surface a container 40. For defining a tortuous withdrawal opening for the film assemblage there are provided a number of spaced rods 100, there being two rows of these rods 100, an inner and an outer row, the film assemblage being adapted to pass between a pair of rods 100 in the inner row and also between a pair of rods 100 in the outer row. Positioned between the two rows of rods 100 is another row of rods 102. As can be seen, the rods 102 are positioned so as to intersect a plane drawn between matching pairs of rods in the inner and outer rows. For the purpose of furnishing a light seal to the above structure, there is provided a light-seal coating such as felt to each of the outer rods. This coating is schematically shown at 104. This light seal 104 has the additional function, in some cases, of acting as a trap for wiping excess liquid from the film assemblage as it passes therethrough.

In the use of the modification of the invention shown in Fig. 6, as the film assemblage is withdrawn therethrough, it follows the curved path taken by the leader 32. Thus it is first bent around the middle rod 102, this rod exerting a high unit pressure upon the container 40 as the container passes thereby. The film unit is then bent in an opposite direction around the outer rod 100. At this point, however, the liquid should have been released from the container by the pressure exerted by rod 102 and the second bending of the film unit primarily aids in the spreading of the liquid composition. The unit pressure applied to the released liquid by the rod 102 in most cases acts to spread this liquid as well as to release it. While the rods 102 have been shown preferably as cylindrical, they may assume a number of shapes. In some cases, where a high unit pressure is desired for releasing the liquid from the container, the point of contact between the rod and the film unit may be considerably sharpened so as to give this high concentration of pressure on the film assemblage.

The novel magazine has been shown as a complete housing, which, except for the exposure opening, is completely light-tight. This is a preferred form of magazine. However, the rear portions of the magazine may be considerably cut down so as to effect a saving of materials in manufacturing the magazine. In this case, the light-tightness may be supplied by the magazine holder on the camera. The magazine holder may also impart the necessary structural rigidity to the magazine, particularly at that portion containing the means defining the withdrawal openings.

While the various modifications of the invention have been described in their preferred forms, i.e., as novel magazines and film assemblages for insertion in a camera having a lens, it is contemplated that the invention may be employed in other devices having no lens or shutter.

Since certain changes may be made in the above product without departing from the scope of the invention herein involved, it is intended that all matter contained in the above description or shown in the accompanying drawings shall be interpreted as illustrative and not in a limiting sense.

What is claimed is:

1. A magazine for use with photographic film assemblages of the type wherein a liquid composition is releasably held by a container associated with said film assemblage for release within said film assemblage and for permeation of at least a photosensitive layer thereof, said magazine comprising walls defining a portion thereof for holding at least one of said film assemblages, means defining an exposure opening in one of said walls, a portion of said magazine constituting a discharge opening through which said assemblage may be discharged from said magazine in a predetermined path, means positioned adjacent said path adapted to apply a liquid-releasing pressure to said container, said last-named means being capable of being rendered operative to release said liquid upon relative movement between a portion of said assemblage and said means, said last-named means comprising an inner row of bars, an outer row of bars and an intermediate row of bars, a light-seal material associated with at least one of said rows of bars, said intermediate row of bars being staggered with respect to at least one of the other rows of bars.

2. A magazine for use with photographic film assemblages of the type wherein a liquid composition is releasably held by a container associated with said film assemblage for release within said film assemblage and for permeation of at least a photosensitive layer thereof, said magazine comprising walls defining a portion thereof for holding at least one of said film assemblages, means defining an exposure opening in one of said walls, a portion of said magazine constituting a discharge opening through which said assemblage may be discharged from said magazine in a predetermined path, means positioned adjacent said path adapted to apply a liquid-releasing pressure to said container, said last-named means being capable of being rendered operative to release said liquid upon relative movement between a portion of said assemblage and said means, said last-named means comprising a plurality of similarly curved members of generally sinusoidal shape whose direction of curvature changes a plurality of times, each adjacent pair of curved members defining a curved path of travel for the assemblage as it is withdrawn, the curvature imparted to said assemblage being sufficient to rupture the container of said assemblage and to spread the contents thereof within said assemblage.

3. A magazine for use with photographic film assemblages of the type wherein a liquid composition is releasably held by a container associated with each said film assemblage for release within said film assemblage and for permeation of at least a photosensitive layer thereof, said magazine comprising walls defining a portion thereof for holding at least one of said film assemblages, means defining an exposure opening in one of said walls, a portion of said magazine constituting a discharge opening through which said assemblage may be discharged from said magazine in a predetermined path, and means positioned adjacent said path adapted to apply a liquid-releasing pressure to said container, said last-named means being capable of being rendered operative to release said liquid upon relative movement between a portion of said assemblage and said means, said last-named means comprising a plurality of members having curved surfaces, said members being so positioned with respect to one another and the path of movement of an assemblage therebetween that at least two of said curved surfaces face in the same direction and bear against one side of said assemblage at spaced-apart locations and a third surface faces in the opposite direction and bears against the opposite surface of said assemblage at a location intermediate said two curved surfaces whereby said assemblage is caused to assume a generally sinusoidal configuration, causing rupture of the container of said assemblage and spreading of its contents within said assemblage as the latter is moved between said members.

4. A magazine for use with photographic film assemblages of the type wherein a liquid composition is releasably held by a container associated with each said film assemblage for release within said film assemblage and for permeation of at least a photosensitive layer thereof, said magazine comprising walls defining a portion thereof for holding at least one of said film assemblages, means defining an exposure opening in one of said walls, a portion of said magazine constituting a discharge opening through which said assemblage may be discharged from said magazine in a predetermined path, and means positioned adjacent said path adapted to apply a liquid-releasing pressure to said container, said last-named means comprising a plurality of members providing at least three convex curved surfaces, said members being so positioned with respect to one another and the path of movement of an assemblage therebetween that at least two of said convex curved surfaces face in the same direction in position to bear against one side of said assemblage at spaced-apart locations and a third convex curved surface faces in the opposite direction and is located in position to bear against the opposite side of said assemblage at a location intermedaite the first-mentioned two convex curved surfaces whereby said assemblage is caused to assume a generally sinusoidal curvature to impart a bending stress to said assemblage sufficient to rupture the container thereof and to spread its fluid contents within said assemblage.

5. A magazine for use with photographic film assemblages of the type wherein a liquid composition is releasably held by a container associated with each said film assemblage for release within said film assemblage and for permeation of at least a photosensitive layer thereof, said magazine comprising walls defining a portion thereof for holding at least one of said film assemblages, means defining an exposure opening in one of said walls, a portion of said magazine constituting a discharge opening through which said assemblage may be discharged from said magazine in a predetermined path, and means positioned adjacent said path adapted to apply a liquid-releasing pressure to said container, said last-named means being capable of being rendered operative to release said liquid upon relative movement between a portion of said assemblage and said means, said last-mentioned means comprising a plurality of curved members having at least three convex surfaces, at least two of said surfaces facing in one direction and a third surface located intermediate the first-mentioned two surfaces and intersecting a plane drawn between the outer two of said surfaces, said members being so positioned with respect to one another and the path of movement of an assemblage therebetween that said outer two of said surfaces press against one side of said assemblage at spaced-apart locations and said third curved surface bears against the opposite side of said assemblage at a location intermediate said outer two of said surfaces whereby said assemblage is caused to assume a curvature which changes a plurality of times so that said assemblage is drawn in contact with and around a portion of each of said curved surfaces to impart a bending stress to said assemblage sufficient to rupture said container and to spread the contents of said container within said assemblage.

6. A magazine for use with photographic film assemblages of the type wherein a liquid composition is releasably held by a container associated with each said film assemblage for release within said film assemblage and for permeation of at least a photosensitive layer thereof, said magazine comprising walls defining a portion thereof for holding at least one of said film assemblages, means defining an exposure opening in one of said walls, a portion of said magazine constituting a discharge opening through which said assemblage may be discharged from said magazine in a predetermined path, and means positioned adjacent said path adapted to apply a liquid-releasing pressure to said container, said last-named means comprising at least three rounded bars so positioned relative to one another as to define a curved path of travel for the assemblage as it is withdrawn, the outer two of said bars being so positioned with respect to the third, intermediate bar that the curvature of said path changes a plurality of times and causes said assemblage to be drawn around a portion of said intermediate bar to impart a bending stress to said assemblage sufficient to rupture said container and to spread the contents of said container within said assemblage.

7. A magazine for use with photographic film assemblages of the type wherein a liquid composition is releasably held by a container associated with each said film assemblage for release within said film assemblage and for permeation of at least a photosensitive layer thereof, said magazine comprising walls defining a portion thereof for holding at least one of said film assemblages, means defining an exposure opening in one of said walls, a portion of said magazine constituting a discharge opening through which said assemblage may be discharged from said magazine in a predetermined path, and means positioned adjacent said path adapted to apply a liquid-releasing pressure to said container, said last-named means comprising a plurality of similarly curved members whose directions of curvature change at least three times, each adjacent pair of curved members providing at least three convex curved surfaces intersecting a plane drawn between the outer two of said curved surfaces, said surfaces defining a curved path of travel for said assemblage as it is withdrawn between said pair of members, the curvature of said path changing a plurality of times so that said assemblage is drawn in contact with and around a portion of each of said curved surfaces to impart a bending stress to said assemblage sufficient to rupture said container and to spread the contents of said container within said assemblage.

References Cited in the file of this patent

UNITED STATES PATENTS

| | | |
|---|---|---|
| 2,405,160 | Morse | Aug. 6, 1946 |
| 2,495,111 | Land | Jan. 17, 1950 |
| 2,495,113 | Gannon | Jan. 17, 1950 |
| 2,669,168 | Land | Feb. 16, 1954 |